United States Patent [19]

Tomita et al.

[11] 4,327,384
[45] Apr. 27, 1982

[54] ROTARY HEAD TYPE MAGNETIC TAPE RECORDING REPRODUCING APPARATUS

[75] Inventors: Masao Tomita, Neyagawa; Takenobu Isaka, Moriguchi; Mineo Mino, Hirakata; Kiyoji Fujisawa, Nara, all of Japan

[73] Assignee: Matsushita Electric Industrial Co., Ltd., Kadoma, Japan

[21] Appl. No.: 116,464

[22] Filed: Jan. 29, 1980

[30] Foreign Application Priority Data

Jan. 31, 1979 [JP] Japan .................. 54-10127

[51] Int. Cl.³ .................. G11B 21/10; G11B 5/54
[52] U.S. Cl. .................. 360/77; 360/70; 360/107; 360/109
[58] Field of Search .................. 360/77-78, 360/70, 9-10, 109, 113, 107

[56] References Cited

U.S. PATENT DOCUMENTS

| | | | |
|---|---|---|---|
| 4,106,065 | 8/1978 | Ravizza | 360/77 X |
| 4,143,405 | 3/1979 | Kubota | 360/70 |
| 4,148,083 | 4/1979 | Watanabe | 360/77 |
| 4,163,994 | 8/1979 | Sakamoto et al. | 360/77 X |
| 4,172,265 | 10/1979 | Sakamoto et al. | 360/77 |
| 4,229,773 | 10/1980 | Sakamoto | 360/77 |

FOREIGN PATENT DOCUMENTS 54-113308  9/1979  Japan ........................... 360/77

Primary Examiner—John H. Wolff
Attorney, Agent, or Firm—Wenderoth, Lind & Ponack

[57] ABSTRACT

A rotary head type magnetic tape recording/reproducing apparatus, by which a tracking condition of the reproducing heads and a recorded track can be automatically adjusted. This apparatus includes an oscillator for imparting small vibrations to the reproducing heads, a synchronous detector, an integration adder circuit including an adder and a delay circuit rotary heads mounted on a positionable element, and from the small vibrations. A tracking error signal which is derived by wobbling circuit is applied to the integration adder circuit, and the positionable element is controlled by the output signal of the integration adder means so as to construct a servo loop. Accordingly, proper tracking can be attained even for large tracking error.

3 Claims, 11 Drawing Figures

FIG. 6a  $E_i$  V 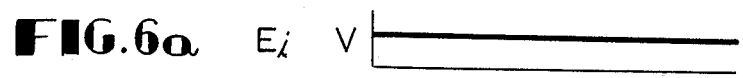
FIG. 6b  $P_i$ 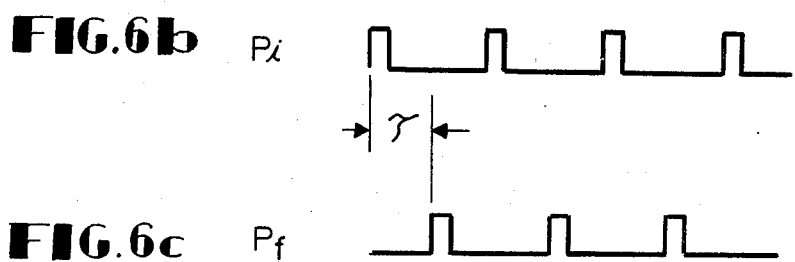
FIG. 6c  $P_f$
FIG. 6d  $E_s$  V 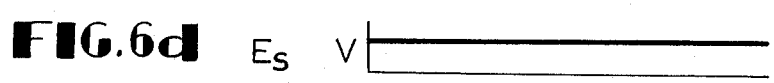
FIG. 6e  $E_f$ 
FIG. 6f  $E_o$  $-V$ 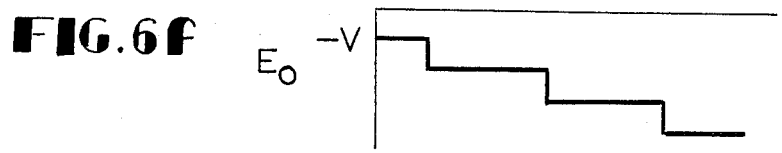

ROTARY HEAD TYPE MAGNETIC TAPE RECORDING REPRODUCING APPARATUS

BACKGROUND OF THE INVENTION

This invention relates to a rotary head type magnetic recording/reproducing apparatus (which will be referred to as a VTR hereinafter, and which includes such apparatus having no recording function), and more particularly to such apparatus constructred so as to make it possible to automatically bring the tracking state to an optimum tracking state even upon slow motion or still picture reproduction.

Conventionally, the rotary heads in a VTR are required to trace on recorded tracks with high fidelity even upon slow motion or still picture reproduction. So, the tracking controlling is conventionally performed by: preliminarily recording control signals corresponding to the rotary positions of the rotary heads; and controlling, upon reproduction, the relative positions between the rotary heads and the tape on the basis of the control signals so as to cause the rotary heads to trace on the same tracks as those used for recording.

In this case, the tracking controlling is performed at only the starting point or ending point of each recorded track. So, the tracking, on the way, of recorded signals which might contain important information would undesiredly become insufficient. Accordingly, a conventional VTR has a manual tracking shifter which is operated by an operator for setting the tracking condition at an optimum S/N ratio of reproduced pictures. Such an operation has problems in that such an operation is very troublesome to the operator since it is difficult for the operator to judge the optimum S/N ratio.

For solving these problems, a VTR was developed recently, which does not require the use of a tracking shifter, and in which the rotary heads continuously scan the recorded tracks correctly from the starting point to the ending point of the recorded tracks. This operation principle is that the rotary heads are held via a piezoelectric element which displaces deflectingly in the lateral direction of the recorded tracks, and the rotary heads are moved to keep the on-tracking by moving the piezoelectric element (positionable element). In this case, control signals to represent direction and amount of the deviations of the rotary heads from the recorded tracks are necessary. Such control signals are obtained by: vibrating the rotary heads by a reference frequency $f_c$ of a sinusoidal wave signal (this vibration is called wobbling); and synchronously detecting the then generated envelope detection output. This performance will be described in more detail with reference to FIG. 1. FIG. 1 shows relationship between recorded tracks T and the scanning traces R of the rotary heads, and the envelope detection output waveforms of the RF signals then obtained from the rotary heads.

In FIG. 1, A1 shows the case when the vibration center of a rotary head passes the center position of the recorded track T, wherein the only portion of the recorded track actually reproduced by the rotary head is shown therein by hatching on the recorded track T. The envelope waveform of the reproduced signal then is a sinusoidal wave of the frequency $2f_c$ as shown by A2. The case B1 represents the case when the vibration center of the rotary head has displaced upward, wherein the full line shows the state when the rotary head has displaced as much as the wobbling amount, while the broken line shows the state when the rotary head has displaced by an amount smaller than the wobbling amount. The envelope waveform in this case is a sinusoidal wave of a reference frequency $f_c$ of the wobbling, and an opposite phase to the reference frequency signal, as shown by B2. The amplitude of the envelope waveform is proportional to the displacement amount, i.e. track deviation or tracking error amount. Likewise, C1 of FIG. 1 represents the case when the vibration center of the rotary head has displaced downward. Then, the envelope waveform C2 is a sinusoidal wave of the frequency $f_c$ and is in-phase with the reference frequency signal. It is apparent from the above descriptions that, paying attention to reference frequency component (wobbling frequency $f_c$) of the envelope waveform reproduced from the rotary head, its phase represents the direction of track deviation or tracking error, and its amplitude represents the amount of track deviation or tracking error. Therefore, by using this signal as a control signal, a servo system can be constructed for causing the rotary head to keep on-tracking on the recorded track T.

However, a conventional automatic tracking system to operate on the above described principle have the following drawbacks. That is, the track deviation amount or tracking error amount correctable by the conventional automatic tracking system is limited by the wobbling amount. The case D1 in FIG. 1 shows the case when the vibration center of the rotary head has displaced upward by an amount exceeding the wobbling amount. In this case, the total level of the envelope is lower than that in the case B1, but the reference frequency component in this case has exactly the same emplitude as that of the case B2. That is, when there is occurring a tracking error exceeding the wobbling amount, the amplitude of the reference frequency component of an envelope detection output is not totally in proportion to the tracking error, but its amplitude becomes saturated or levels off by the wobbling amount. This is true also for the case when the vibration center of the rotary head has displaced downward.

It is apparent from the above-described relationships that the characteristics of the control voltage (obtained by synchronously detecting the envelope detection output by the reference signal) relative to the tracking errors can be shown by FIG. 2. The horizontal axis of FIG. 2 represents the tracking error, while the vertical axis represents the control voltage detected from the envelope. In the range of the tracking error between $-T_W$ (upward $T_W$ error) and $T_W$ (downward $T_W$ error), the control voltage obtained is proportional to the tracking error, whereas in the range of errors greater than $T_W$, the control voltage is constant, and the control voltage vanishes at $T_D$. The value $T_D$ represents a critical point where the head-scanning trace is tangent to the recorded track without any overlapping between the trace and the track. If a tracking servo is controlled by using such a control voltage, on-tracking can be attained in the tracking error range of $-T_W$ to $T_W$ by realizing the servo mechanism, whereas ontracking cannot be attained but the head is only shifted by a constant amount to the center of the track in the tracking error range exceeding $\pm T_W$. In other words, the controllable range is limited to the range between $-T_W$ and $T_W$.

As apparent from the foregoing descriptions, the range $-T_W$ to $T_W$ corresponds to the wobbling amount. Therefore, according to such conventional method, the wobbling amount is required to be increased in order to widen the controllable range of tracking, which, however, causes an increase of jitter, chroma color shading, etc., whereby the reproduced picture quality is very much deteriorated. On the other hand, if the wobbling amount is reduced, the controllable range of tracking is also reduced, which causes generation of a noise band in a reproduced picture.

SUMMARY OF THE INVENTION

The object of this invention is to eliminate the above-described drawbacks, and to realize a rotary head type VTR having a tracking correcting function such that a wide controllable range of tracking can be obtained by a small amount of wobbling.

This object is achieved according to this invention by providing a rotary head type magnetic tape recording-/reproducing apparatus, comprising: rotary head means for reproducing video signals recorded along a track on a record medium; a positionable element for mounting said rotary head means thereon for displacement lateral to the track; oscillation means coupled to said positionable element to provide a continuous lateral vibration; envelope detecting means which detects an envelope signal bearing a correspondance to an envelope of a signal derived from said rotary head means; synchronous detection means which detects synchronous components of said envelope signal using a reference signal from said oscillation means; integration adder means including an adder and a delay means; and drive control means for supplying to said positionable element a compound signal which includes the signal from said integration adder means and said signal from said oscillation means.

BRIEF DESCRIPTION OF THE INVENTION

This object and other features of this invention will be apparent upon considering the following detailed descriptions taken in conjunction with the other accompanying drawings, in which:

FIG. 6(a) to (f) are signal waveforms at various points of the arrangement of FIG. 5.

DESCRIPTION OF THE PREFERRED EMBODIMENTS

Figure 4:
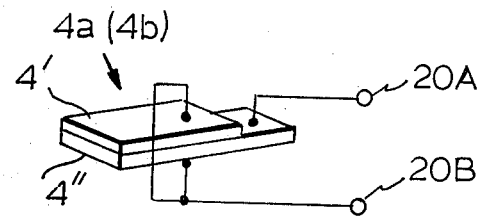
FIG. 4 is a schematic perspective view of an example of a piezoelectric element to be used in this invention.
Figure 3:
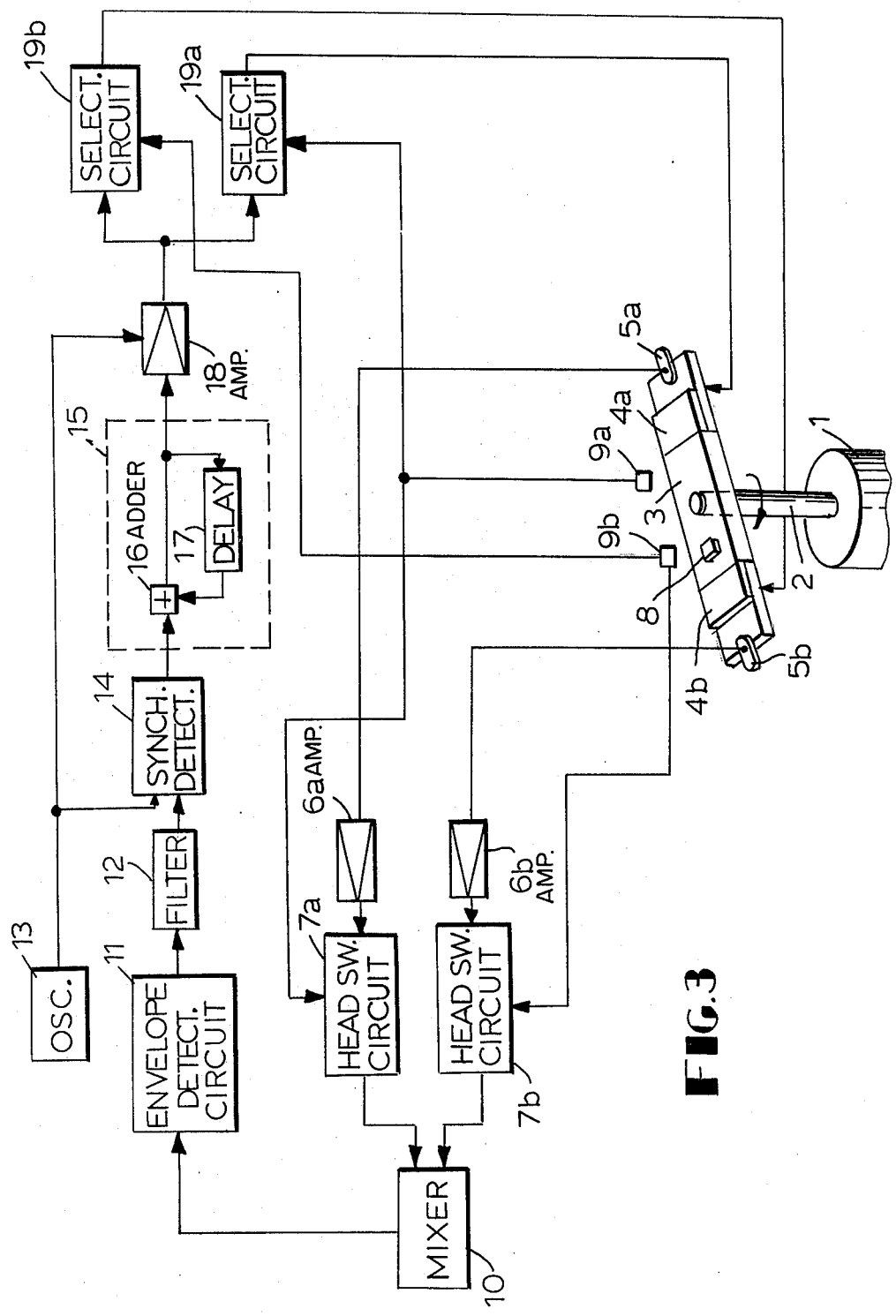
FIG. 3 is a schematic block diagram of a main part of an example of this invention.

This invention will be described below with reference to the shown example of this invention. Referring to FIG. 3, reference numeral 1 designates a drum motor, which has a head cover 3 at a rotary axis 2 thereof. Piezoelectric elements 4a, 4b are mounted on respective ends of the head cover 3. The piezoelectric elements 4a and 5b each have a structure such that two piezoelectric plate 4' and 4" each having electrodes on opposite major surfaces thereof, are bonded to form a piezoelectric bimorph bender (4a or 4b), as shown in FIG. 4. The polarization direction of each piezoelectric plate coincides with the thickness direction, and the piezoelectric bimorph bender deflects in the polarization direction in correspondence with the value of an applied d.c. voltage when the d.c. voltage is applied to the terminals 20A, 20B connected to the electrodes on each piezoelectric bimorph bender. Accordingly, the rotary heads 5a, 5b respectively mounted on the piezoelectric elements 4a, 4b also deflect in the polarization direction. It is assumed here that the deflection direction of the piezoelectric bimorph bender is the width direction of the tracks of the magnetic tape to which the rotary heads 5a, 5b are contacting. This direction is perpendicular to the rotational direction of the drum motor 1, e.g. in a VTR of rotary head type of a helical scanning direction.

On the other hand, on the magnetic tape, video signals are recorded as recorded tracks in a manner such that each field of the video signals is recorded on one magnetic track. The RF signals picked up by the rotary heads 5a, 5b are fed to head switching circuits 7a, 7b via amplifiers 6a, 6b, respectively. The head switching circuitds 7a, 7b are supplied with rotational phase signals of the rotary heads 5a, 5b whose signals are obtained by detecting a magnet piece 8 fixed on a head bar 3 in a conventional manner by using rotational phase detection heads 9a, 9b that are stationary. The RF signals from the rotary heads 5a, 5b are alternately picked up sequentially per one field by the head switching circuits 7a, 7b, and are then combined by a mixer 10. The signal obtained by the mixer 10 is fed to an envelope detection circuit 11 which detects the envelope of the signal fed thereto, and the thus detected envelope output is applied to a band pass filter 12 (which will be called a BPF hereinafter). The center frequency of the BPF 12 is selected to be equal to the oscillation frequency of an oscillator 13. The output of the oscillator 13 and the output of the BPF 12 are synchronously detected by a synchronous detector 14, and this detection output is applied to an integration adder 15. The integration adder 15 comprises an adding circuit 16 and a delay circuit 17 connected in the manner as shown, and accumulatively or integratingly add the detection output. Therefore, even if the tracking error is large and the rotary head is positioned at a position outside the $\pm T_W$ range, the control voltage is accumulated at the output of the integration adder, so that a control voltage corresponding to a tracking error is always obtained.

This control voltage and the output of the oscillator 13 together are applied to an amplifying circuit 18 for driving the piezoelectric element (positionable element of bimorph bender). The output of the amplifying circuit 18 is divided into two paths by selection circuits 19a, 19b operated by rotational phase signals from the above-described stationary heads 9a, 9b used for rotational position detection. The selection circuits 19a, 19b provided for feeding the output of the amplifying circuit 18 to the terminals 20A, 20B of the piezoelectric element 4a when the signals from the mixer 10 are those from the rotary head 5a and for feeding the output of the amplifying circuit 18 to the terminals 20A, 20B of the piezoelectric element 4b when the signals from the mixer are those from the rotary head 5b. Such an operation can be attained by synchronously controlling the head switching circuits 7a, 7b and the selection circuits 19a, 19b using the rotational phase signals from the stationary heads 9a, 9b used for detecting the rotational phase. Besides, the above-described amplifying circuit 18 (for driving the piezoelectric element), the selection circuits 19a, 19b, and the controlling means therefor constitute drive control means for the piezoelectric element.

Figure 1:
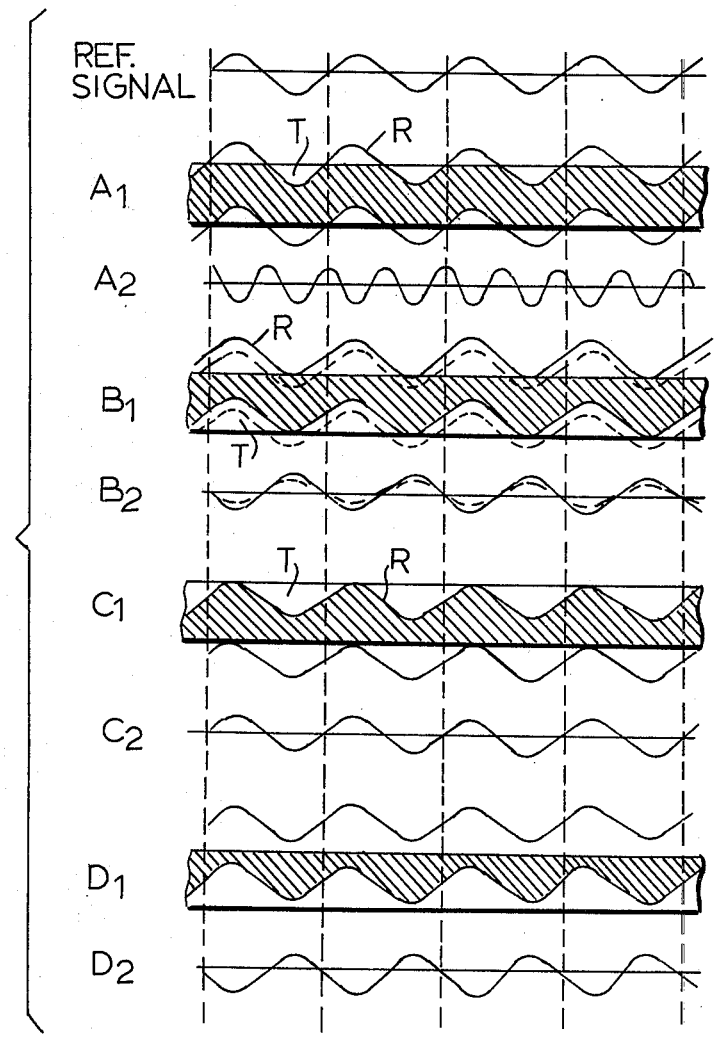
FIG. 1 illustrates the various waveforms of a VTR.

Next, the behavior of the rotary heads 5a, 5b used to scan the recorded tracks will be described. The output of the oscillator 13 is applied to the amplifier 18 for driving the piezoelectric element, and thus the piezoelectric elements 4a, 4b vibrate up and down in a flexure mode or bending mode at the oscillation frequency $f_c(Hz)$ of the oscillator 13. So, the rotary heads 5a, 5b vibrate in the width direction of the tracks of the magnetic tape. Under such state, if the rotary heads 5a, 5b are displaced upward relative to the recorded track T as shown by B1 of FIG. 1, an envelope detection waveform as shown by B2 of FIG. 1 is obtained. Likewise, if the rotary heads are displaced downward as shown by C1, an envelope detection waveform of C2 is obtained. If the rotary heads are kept on-tracking as shown by A1, an envelope detection waveform of A2 is obtained. That is, the RF signal output from the rotary heads 5a, 5b is amplitude-modulated by $f_c(Hz)$, wherein the waves B2 and C2 have the same modulation frequency $f_c(Hz)$ but have different phases which are different by 180°, the wave C2 having the same phase as the modulation frequency and the wave B2 having a phase opposite thereto.

Figure 2:
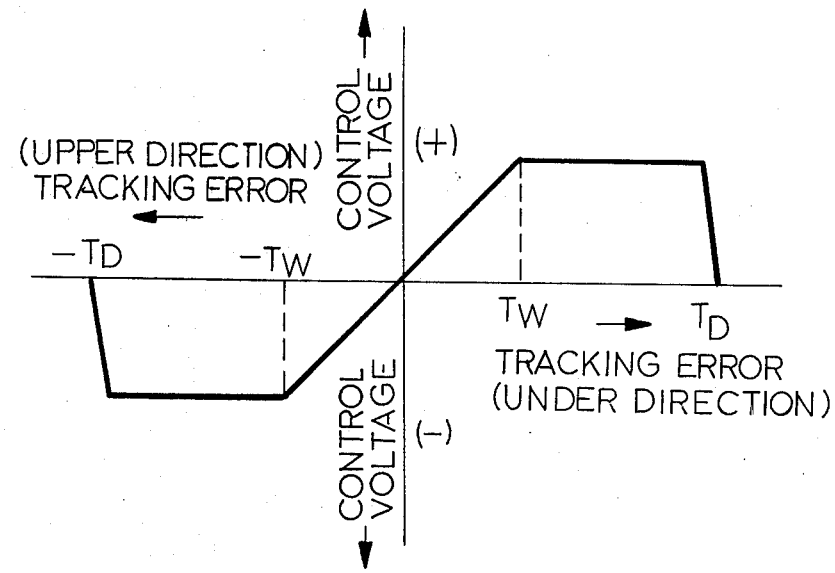
FIG. 2 illustrates the relationship between the control voltage and tracking error in a VTR.

On the other hand, in the case of A2, the RF signal output has a frequency $2f_c$ which is twice the modulation frequency. Therefore, a negative control voltage and a positive control voltage are respectively obtained upon the upward and downward displacements of the head, as shown in FIG. 2, by: feeding this RF signal to the envelope detection circuit 11; feeding the thus obtained envelope detection output to the BPF having the center frequency $f_c(Hz)$; and subjecting the thus obtained BPF output and the $f_c(Hz)$ signal of the oscillator 13 to synchronous detection in the synchronous detector 14. By applying this control voltage from the synchronous detector 14 to the integration adder 15, an error voltage can be obtained which responds to a tracking error over $T_W$. Thus the rotary heads 5a, 5b can be moved in the width direction of the tracks so as to be controlled to attain complete on-tracking, by amplifying the error voltage at the amplifying circuit 18 and by selectively applying the thus amplified signal to the piezoelectric elements 4a, 4b with the aid of the selection circuits 19a, 19b.

Figure 5:
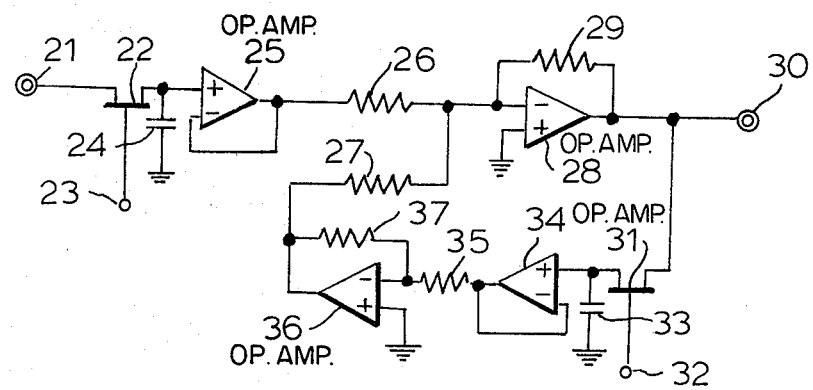
FIG. 5 is a schematic circuit diagram of an example of an integration adder means to be used in this invention.

Now, the operation of the integration adder 15 will be described in more detail. FIG. 5 is a circuit diagram showing a concrete structural example of the integration adder. FIGS. 6(a) to (f) are waveforms at certain points of the circuit of FIG. 5. In these drawings, an analog switch 22, a capacitor 24 and an operational amplifier 25 constitute a sample-hold circuit, which operates in either a sample mode or a hold mode depending on control signals applied to the control terminal 23. Likewise, an analog switch 31, a capacitor 33 and an operational amplifier 34 which operates as a voltage follower constitute a second sample-hold circuit. An operational amplifier 28 and resistors 29, 26, 27 constitute an adding circuit, while an operational amplifier 36 and resistors 35, 37 constitute an inverting amplifier.

Now assume the case of a downward tracking error of a large amount in the example of this invention of FIG. 3. Then, a control voltage in the range shown in FIG. 2 where it is constant, appears at the output of the synchronous detector 14. This appearing control voltage is shown by $E_i$ in FIG. 6(a), which is a constant voltage V even as time changes. This voltage $E_i$ is applied to the input terminal 21 of the integration adder shown in FIG. 5. To the control terminal 23 of the sample-hold circuit, a pulse signal shown by $P_i$ of FIG. 6(b) is applied. Thus, at the output of the operational amplifier 25, a signal shown by $E_s$ of FIG. 6(d) which is substantially the same as the signal $E_i$ is obtained as a sample-hold output.

This signal $E_s$ is added to an output $E_f$ of the inverting amplifier 36 shown in FIG. 6(e), and this added sum appears at the output of the operational amplifier 28, namely at the output terminal 30. If $E_f$ is zero during the time period $\tau$, the input voltage V appears at the output terminal 30 to be simple inverted during the period. See FIG. 6(f). This output voltage $E_o$ is sample and held by the second sample-hold circuit having the control terminal 32, and its output then appears at the output of the inverting amplifier 36. To the control terminal 32, a pulse signal shown by $P_f$ of FIG. 6(c) delayed by the time $\tau$ from the pulse signal $P_i$ is applied. Therefore, at the output of the inverting amplifier 36, the signal $E_f$ having the same polarity as that of the input signal $E_i$ appears and is added to the input signal $E_i$, so that such signal $E_o$ that is produced by accumulatively adding the input signal $E_i$ is obtained at the output terminal. That is, a control signal which stepwise increases its value up to a value corresponding to the tracking error is obtained.

Likewise, when a large tracking error in the opposite direction, i.e. upward, occurs, a control signal which stepwise increases its value to positive direction is obtained at the output terminal 30. By using this control signal as a control voltage for the tracking servo mechanism, a very wide range control can be performed.

As described in detail above, this invention enables on-tracking even for a very wide range tracking error, by applying a control signal (obtained by synchronous detection with the aid of the wobbling signals) to an integration adder or integration adding means comprising a singal adding means and a delay means and applying the output of the integration adding means, as a drive control voltage, to a piezoelectric element or positionable means on which the rotary head means is mounted so as to obtain a servo loop. This effect makes it possible to minmize the amount of wobbling which would provide undesirable influence, such as jitter and color shading, to reproduced signals.

As already described above, the value of tracking error $T_W$ in FIG. 2 is determined by the wobbling amount itself. So, if an integration adder by which a control voltage corresponding to a tracking error can be obtained even in the saturation region is used, the linear region of the control voltage can be narrow. So, the $T_W$ value can be selected to be small, hence the wobbling amount can be made small. In other words, this invention realizes a tracking servo loop which enables a very small amount of wobbling. So, good quality reproduced pictures of which the tracking is complete and in which jitter or color shading caused by wobbling hardly occurs can be obtained, so that the effect of this invention is very great.

What is claimed is:

1. A rotary head type magnetic tape recording/reproducing apparatus comprising:
   rotary head means for reproducing video signals recorded along a track on a record medium;
   a positionable element for mounting said rotary head means thereon for displacement lateral to the track;
   oscillation means coupled to said positionable element to provide a continuous lateral vibration;

envelope detecting means which detects an envelope signal bearing a correspondence to an envelope of a signal derived from said rotary head means;

synchronous detection means which detects synchronous components of said envelope signal using a reference signal from said oscillation means;

integration adder means including an adder and a delay means; and drive control means for supplying to said positionable element a compound signal which includes a signal from said integration adder means and said signal from said oscillation means.

2. A rotary head type magnetic tape recording/reproducing apparatus according to claim 1, wherein said adder of said integration adder means adds a synchronous detection signal from said synchronous detection means and a signal from said delay means which is supplied with an output signal of said adder.

3. A rotary head type magnetic tape recording/reproducing apparatus according to claim 1, wherein said integration adder means includes a first sample hold circuit which is supplied with a synchronous detection signal from said synchronous detection means and a second sample hold circuit which is supplied with an output signal of said adder, in which sample pulses to be applied to said second sample hold circuit are delayed by a predetermined time lag with respect to sample pulses to be applied to said first sample hold circuit, wherein the thus provided delaying function constitutes said delay means.

* * * * *